(12) United States Patent
Friesen et al.

(10) Patent No.: US 8,874,304 B2
(45) Date of Patent: Oct. 28, 2014

(54) METHOD FOR MONITORING THE STATE OF A BOGIE OF A RAILWAY VEHICLE COMPRISING AT LEAST ONE WHEEL SET

(75) Inventors: Ulf Friesen, Neubiberg (DE); Thomas Burkhart, München (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 57 days.

(21) Appl. No.: 13/510,360

(22) PCT Filed: Nov. 16, 2010

(86) PCT No.: PCT/EP2010/067562
§ 371 (c)(1),
(2), (4) Date: Jun. 25, 2012

(87) PCT Pub. No.: WO2011/061182
PCT Pub. Date: May 26, 2011

(65) Prior Publication Data
US 2012/0259487 A1 Oct. 11, 2012

(30) Foreign Application Priority Data

Nov. 18, 2009 (DE) .......................... 10 2009 053 801

(51) Int. Cl.
*G06F 7/00* (2006.01)
*G01M 17/00* (2006.01)
(Continued)

(52) U.S. Cl.
CPC ............. *B61L 15/0081* (2013.01); *B61F 5/245* (2013.01); *B61F 5/308* (2013.01); *B61F 9/005* (2013.01); *G01M 17/10* (2013.01)
USPC ........... 701/29.1; 701/29.2; 701/29.3; 701/20

(58) Field of Classification Search
CPC ........... G06F 17/00; G06F 19/00; G06F 7/00; G06F 15/00; G02B 26/101; G02B 27/017; G02B 26/10; G02B 27/01; B60L 15/2063; B60L 3/10; B60L 11/14; B60L 15/20
USPC ........... 709/223; 701/36, 19, 30.4, 29, 35, 20, 701/1, 29.4; 246/249, 120, 182 C
See application file for complete search history.

(56) References Cited

U.S. PATENT DOCUMENTS 4,676,173 A * 6/1987 Mielcarek et al. ............ 105/209
4,685,174 A * 8/1987 Hager .............................. 16/44
(Continued)

FOREIGN PATENT DOCUMENTS

CN 1446161 A 10/2003
DE 1530112 C3 2/1970
(Continued)

OTHER PUBLICATIONS

Chinese Office Action for Application Publication No. 100098, dated Mar. 28, 2014.
(Continued)

*Primary Examiner* — Calvin Cheung
*Assistant Examiner* — Luis A Martinez Borrero
(74) *Attorney, Agent, or Firm* — Barnes & Thornburg LLP

(57) ABSTRACT

A method for monitoring the state of a bogie of a railway vehicle having at least one wheel set, wherein the wheels of the wheel set are rigidly connected by an axle and have an approximately conical wheel profile, and signals corresponding to a sinusoidal run of the wheel set of the bogie based on the conical wheel profile of the wheels are filtered out of signals provided by sensors disposed on the bogie. The frequency of the sinusoidal run is determined relative to boundary conditions, such as the prevailing vehicle speed, and compared to a save value or range of values for the frequency of the sinusoidal run typical for the prevailing boundary conditions, wherein the deviation of the measured frequency from the saved value or range of values for the frequency is monitored.

26 Claims, 3 Drawing Sheets

(51) Int. Cl.
*G06F 11/30* (2006.01)
*G06F 19/00* (2011.01)
*G07C 5/00* (2006.01)
*B61F 5/24* (2006.01)
*B61F 5/30* (2006.01)
*B61L 15/00* (2006.01)
*B61F 9/00* (2006.01)
*G01M 17/10* (2006.01)

(56) References Cited

U.S. PATENT DOCUMENTS

| | | | |
|---|---|---|---|
| 5,805,797 A * | 9/1998 | Sato et al. | 714/48 |
| 5,826,207 A * | 10/1998 | Ohashi et al. | 701/36 |
| 6,144,904 A * | 11/2000 | Tseng | 701/30.4 |
| 6,175,784 B1 * | 1/2001 | Jicha et al. | 701/19 |
| 6,600,987 B2 * | 7/2003 | Ohtsu | 701/71 |
| 6,860,453 B2 * | 3/2005 | Moretti et al. | 246/169 R |
| 7,213,789 B1 | 5/2007 | Matzan | |
| 7,458,324 B2 * | 12/2008 | Schneider et al. | 105/168 |
| 8,155,808 B2 * | 4/2012 | Tsai | 701/19 |
| 8,423,240 B2 * | 4/2013 | Mian | 701/36 |
| 8,672,273 B2 * | 3/2014 | Brown et al. | 246/169 R |
| 2002/0002435 A1 * | 1/2002 | Ohtsu | 701/71 |
| 2002/0144873 A1 * | 10/2002 | Kato et al. | 188/378 |
| 2003/0178532 A1 * | 9/2003 | Moretti et al. | 246/169 R |
| 2004/0046648 A1 * | 3/2004 | Matsuura | 340/442 |
| 2006/0241831 A1 * | 10/2006 | Watanabe et al. | 701/29 |
| 2007/0050109 A1 * | 3/2007 | Ozawa | 701/35 |
| 2007/0129861 A1 * | 6/2007 | Hashiba et al. | 701/29 |
| 2007/0208841 A1 * | 9/2007 | Barone et al. | 709/223 |
| 2007/0219682 A1 * | 9/2007 | Kumar et al. | 701/19 |
| 2008/0079280 A1 * | 4/2008 | Nakamura et al. | 296/35.3 |
| 2008/0156944 A1 * | 7/2008 | Aurich et al. | 246/182 |
| 2008/0195265 A1 * | 8/2008 | Searle et al. | 701/19 |
| 2009/0154994 A1 * | 6/2009 | Malit | 404/96 |
| 2009/0185858 A1 * | 7/2009 | Malit | 404/75 |
| 2009/0276107 A1 * | 11/2009 | Reimann et al. | 701/19 |
| 2009/0283942 A1 * | 11/2009 | Nakamura | 267/64.13 |
| 2009/0326746 A1 * | 12/2009 | Mian | 701/19 |
| 2010/0204857 A1 * | 8/2010 | Forrest et al. | 701/19 |
| 2011/0210213 A1 * | 9/2011 | Freise | 246/249 |
| 2011/0231039 A1 * | 9/2011 | Leitel et al. | 701/19 |
| 2012/0006946 A1 * | 1/2012 | Clarissou | 246/120 |
| 2012/0046900 A1 * | 2/2012 | Baert | 702/141 |

FOREIGN PATENT DOCUMENTS

| | | |
|---|---|---|
| DE | 2007558 A1 | 8/1972 |
| DE | 10020521 A1 | 10/2001 |
| DE | 102006001540 B3 | 8/2007 |
| JP | 62-009848 B2 | 3/1987 |
| JP | 2006-335320 A | 12/2006 |
| JP | 2007-218669 A | 8/2007 |

OTHER PUBLICATIONS

Notification Concerning Transmittal of International Preliminary Report on Patentability and Written Opinion of the International Search Authority for International Patent Application No. PCT/EP2010/067562, dated Nov. 16, 2010 and the English Translation.
Search Report for International Patent Application No. PCT/EP2010/067562; Feb. 24, 2011.

* cited by examiner

METHOD FOR MONITORING THE STATE OF A BOGIE OF A RAILWAY VEHICLE COMPRISING AT LEAST ONE WHEEL SET

PRIORITY CLAIM

This patent application is a U.S. National Phase of International Patent Application No. PCT/EP2010/067562, filed 16 Nov. 2010, which claims priority to German Patent Application No. 10 2009 053 801.1, filed 18 Nov. 2009, the disclosures of which are incorporated herein by reference in their entirety.

FIELD

Disclosed embodiments are based on monitoring the state of a bogie of a rail vehicle, comprising at least one wheel set, wherein the wheels of the wheel set are rigidly connected by means of an axle and have an approximately conical wheel profile, and a device for carrying out the method.

BACKGROUND

Diagnostic and monitoring systems are being increasingly used in rail vehicle traffic, the diagnostic and monitoring systems detecting changes in the state of components and assemblies of the rail vehicle in order to detect defects in these components and assemblies. In particular in the case of bogies of rail vehicles, the detection of unacceptable states of wear is of particular interest in terms of operational safety.

DE 10 2006 001 540 B3, which forms a generic type with respect to claim 1, proposes a method for monitoring the state of bogies of a rail vehicle, in which method the wheels of the wheel sets of the bogies are rigidly connected by means of axles and have a conical wheel profile. In this context, the sinusoidal motion of at least one wheel set is monitored, the sinusoidal motion being based on the conical wheel profile of the wheels, and when the sinusoidal motion fails to occur a signal is generated indicating the occurrence of derailing of the wheel set.

However, this method merely permits derailing of wheel sets to be detected depending on whether a sinusoidal motion is present or not in the sense of a binary state because a sinusoidal motion which is present generates a characteristic periodic signal which is completely absent after derailing. However, as a result with the known method there is no possibility of an early warning based on the observation of a slow or creeping change in bogie parameters or the state of wear.

According to DE 100 20 521 B4, which forms the generic type with respect to claim 4, the oscillation behavior of at least one vehicle component of a rail vehicle is monitored. The method described in the document is based on the fact that individual vehicle components react to the excitation of oscillations during operation with natural oscillations with a defined frequency, amplitude and damping. By comparing the determined actual nature oscillation with the anticipated natural oscillation which is stored as a reference value, a changed oscillation behavior of the monitored vehicle component is inferred so that this changed oscillation behavior is related to any fault sources in order to implement onboard diagnostics of rail vehicles. In this context, a frequency parameter, amplitude parameter and/or damping parameter of a natural oscillation of the respective vehicle component is continuously monitored.

In other words, according to the known document, the vehicle component is subjected to a type of modal analysis, and modal parameters such as the natural frequency and damping are monitored in order to detect damage as part of onboard diagnostics. However, the known method evaluates time profiles of the measurement signals in an undifferentiated fashion. In particular, signals which are obtained with the method under completely different peripheral conditions such as, for example, different coefficient of friction conditions or sliding friction conditions are evaluated together. Accordingly, the characteristic values from the Fourrier transformation such as, for example, the values for the natural frequencies and the amplitude maximum values thereof, are subject to a relatively large degree of variation which makes unambiguous and reliable evaluation of the frequency responses more difficult.

A disadvantage of the known method is that the excitation spectrum of a rail vehicle during operation is different to such an extent that at any individual point in time it is unclear what proportion of the measured signal is at all made up by natural oscillations of the respective vehicle component. This is due to the fact that not every external excitation of a vehicle component necessarily leads to natural oscillation of the vehicle component or to oscillation at the respective natural frequency.

Last but not least, for reasons of cost, it is conceivable that not every vehicle component of an assembly which is composed from a plurality of vehicle components such as, for example a bogie with wheel sets and anti-rolling damper is assigned a separate sensor. If therefore such an assembly is equipped with just one sensor and the known onboard monitoring yields the result that the assembly has deviating natural frequency characteristic values, it remains unclear which vehicle component (wheels of the wheel sets, anti-rolling damper) of the assembly has a fault.

SUMMARY

Presently disclosed embodiments make it possible to obtain reliable information about the state of wear of chassis components of a rail vehicle which have a large influence on the motion stability such as, for example, the wheels of the wheel sets and the anti-roll dampers which are used to damp rotational oscillations (rolling) between the bogie and the car body. Furthermore, the chassis component which respectively has the unacceptable state of wear or fault state can be identified with the method according to the disclosed embodiments.

Disclosed embodiments provide a method for monitoring the state of a bogie of a rail vehicle comprising at least one wheel set and at least one anti-rolling damper, wherein the wheels of the wheel set are rigidly connected by means of an axle and have an approximately conical wheel profile, the signals which correspond to a sinusoidal motion of the wheel set of the bogie, based on the conical wheel profile of the wheels are filtered out of the signals supplied by sensor means arranged on the bogie, wherein the frequency of the sinusoidal motion is determined with respect to peripheral conditions such as the respectively present vehicle speed and is compared with a stored value or value range, typical of the present peripheral conditions, for the frequency of the sinusoidal motion, wherein the deviation of the measured frequency from the stored value or value range is monitored for this frequency.

BRIEF DESCRIPTION OF THE FIGURES

Disclosed embodiments are illustrated in the drawing and are explained in more detail in the following description. In the drawings.

DETAILED DESCRIPTION OF THE EMBODIMENTS

Figure 1:
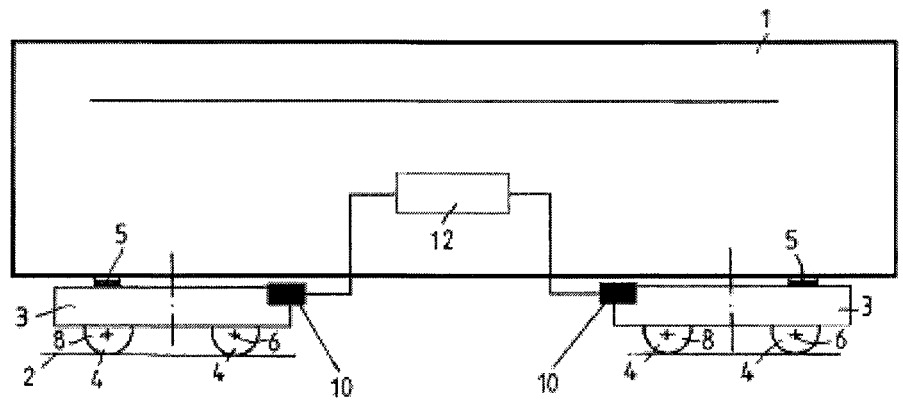
FIG. 1 shows a perspective illustration of a rail vehicle with two bogies comprising in each case two wheel sets and two anti-rolling dampers.

The motion stability of a chassis of a rail vehicle is greatly influenced by the damping properties thereof, for which reason in general, but in particular for high speed trains, anti-rolling dampers are necessary between the bogie and the car body. The overall damping of a bogie is determined by a plurality of parameters:

the damping is conditioned by the properties of the wheels, in particular the conicity and the profile of the wheels which changes as a function of wear, the rotational damping between the bogie and the car body, which includes the damping by the anti-rolling damper or dampers, and the speed of the rail vehicle.

Anti-rolling dampers are known to damp the rotational oscillations of bogies when oscillations occur about the vertical axis. Both the changes in the damping properties and the change in the conicity of the wheels consequently have direct effects on the motion stability of the wheels, in particular on the way in which the so-called rolling of the bogies is manifested.

The rolling of the bogie is triggered by external excitation by the track. These external excitations include: track position error, travelling over railway switches, cornering, and sinusoidal motion of the wheel sets.

The sinusoidal motion of the wheel sets also provides information as to whether there is a reduction in the motion stability owing to increasing equivalent conicity or a change in profile of the wheels of the wheel sets of a bogie or owing to reduced rotational damping of the bogie.

The sinusoidal motion is a description of the motion behavior of rail vehicle wheel sets with a conical wheel profile (conicity). The sinusoidal motion brings about self-centering of the wheel set on the track on the straight and on bends with large radii without contact with the wheel flange having to occur. As a result, better motion behavior and less wear are brought about than in wheel sets which have a cylindrical wheel profile and do not have sinusoidal motion.

Sinusoidal motion occurs as a result of the wheel radii at the two contact points with the track being different in the case of a wheel set with a conical wheel profile which is offset. Since the two wheels of the wheel set are rigidly connected via the axle, the wheel with the relatively large radius moves forward more quickly at the contact point than the wheel with the relatively small radius. For this reason, a wheel set which is positioned too far to the right steers to the left because the wheel radius at the right-hand contact point is larger than at the left-hand contact point. Correspondingly a wheel set which is positioned too far to the left steers to the right. As a result, a longitudinal movement of the wheel set in the form of a sinusoidal curve occurs.

In terms of a model, the sinusoidal motion can be described by Klingel's formula which describes the motion frequency f of this wave-shaped movement of a rail vehicle:

$$f = \frac{v}{2\pi} * \sqrt{\frac{\tan \gamma}{r_0 \cdot s}} \tag{1}$$

where: $\tan \gamma$=equivalent conicity of the respective wheel

The equivalent conicity gives the approximated conical inclination for a wheel profile which is not a purely conical one and in which a purely conical wheel profile with this conical inclination would have a very similar kinematic motion behavior.

$r_1, r_2$ = rolling radii [m]

where $r_0 = \dfrac{r_1 + r_2}{2}$ s=span [given normal track of 1500 mm]
f=sinusoidal motion frequency [Hz] and
v=speed [m/s]

From equation (1) it can be inferred that as the equivalent conicity $\tan \gamma$ rises the sinusoidal motion frequency f increases, that is to say therefore the vehicle is subjected to a high exciter frequency f from the sinusoidal motion of the wheel set. The critical speed at which the vehicle still runs in a stable fashion drops as a result. For high traveling speeds, such as occur in high speed trains, the contact geometry between the wheel and the rail must therefore be in such a state that a small equivalent conicity is present. In other words, for stable straight-ahead motion of the rail vehicle the frequency f of the sinusoidal motion of the wheel sets should be as small as possible, which requires the smallest possible equivalent conicity $\tan \gamma$.

The background of the considerations is therefore that the sinusoidal motion which arises from the interaction of wheels with an approximately conical wheel profile with the rails when certain peripheral conditions are present has a certain amplitude profile and a certain frequency.

If, for example, a frequency determined by means of a Fourier transformation from a measured time signal of a lateral acceleration profile differs by more than a predefined value from a frequency value which is anticipated for these peripheral conditions, this constitutes an indication of the occurrence of an unacceptable state of wear in the form of an unacceptably high equivalent conicity $\tan \gamma$.

The conicity $\tan \gamma$ has in turn an influence on the damping properties of the chassis. The measure of the conicity permits differentiation as to whether the wear of an anti-rolling damper occurs when the damping characteristic value has changed or the reduced damping characteristic value originates at the wheel set.

The amplitude profile of an oscillation which decays after excitation provides conclusions about the damping properties of the bogie, in particular of the anti-rolling properties of the dampers. Through comparison of a measured lateral acceleration profile with an anticipated profile or characteristic values formed therefrom, a statement about the state of wear of the chassis components, such as for example the anti-rotation damper and anti-rolling damper, is possible.

If, therefore, a change is detected in the damping and also a change in the conicity $\tan \gamma$ of the wheels, statements can be made as to whether or not in future a rail vehicle will enter an intolerable unstable state during operation.

In the prior art, the maximum value of the lateral acceleration of a bogie of a rail vehicle has been monitored and a warning signal has been generated when a predefined limiting value is exceeded. However, a way of improving this event-controlled method is state monitoring during which the damping or damping characteristic values of the bogie are determined with respect to lateral movements in order, in particular, to bring about early generation of signals relating to necessary maintenance or repair of the affected bogie.

Lateral excitation, for example, when travelling over a railway switch, generally brings about damped oscillations from which the damping characteristic value of the overall system of the bogie can be determined.

At relatively high speeds the excitation due to the sinusoidal motion comes to the fore and the damping characteristic value can then be determined only by taking into account the conicity of the wheels. The conicity of the wheels is not constant but rather changes due to wear, and it tends to increase as a result of increasing wear.

Based on the measured frequency of the sinusoidal motion it is possible to infer the conicity of the wheels, to be precise independently of the amplitudes of the oscillations and the damping of the overall system of the bogie. As a result, it is possible, for example, to determine the damping characteristic value of the anti-rolling dampers by taking into account the vehicle speed.

At a relatively low speed of the rail vehicle, it is possible to determine damping characteristic values without taking into account the excitation of the sinusoidal motion because the influence of the sinusoidal motion on the damping is then low.

The relationships described generally above can then be represented physically as follows:

In the text which follows, the overall system of the bogie is understood to mean the bogie together with assigned wheel sets and anti-rolling dampers. The running behavior and the stability of a chassis (bogie) of a rail vehicle depend on the overall damping $D_g$. The overall damping $D_g$ of a bogie is composed approximately of the damping of the anti-rolling dampers $D_{schl}$ and the damping of the wheel sets $D_{rad}$ on the basis of their conicity tan γ:

$$D_g = D_{schl} + D_{rad} \quad (2)$$

The damping of the wheel sets $D_{rad}$ is also a function of the speed v and the frequency f of the sinusoidal motion:

$$D_{rad} = f(v, f) \quad (3)$$

At a low speed, the damping of the wheel sets $D_{rad}$ is very low and can be ignored. Therefore, at a low speed the overall damping $D_g$ of a bogie is approximately equal to the damping of the anti-rolling damper $D_{schl}$.

$$D_g = D_{schl} \quad (4)$$

If therefore a change, in particular a reduction, in the overall damping $D_g$ is detected at low speeds, this change can be attributed to a reduction in the damping $D_{schl}$ of the anti-rolling damper or dampers of the bogie.

At relatively high speeds, the conicity tan γ of the wheels has a greater effect. The damping components originating from the anti-rolling dampers and the wheel set conicity therefore can no longer be inferred directly from the overall damping.

$$D_g = D_{schl} + D_{rad} \quad (5)$$

However, the conicity tan γ of the wheels is a function of the sinusoidal motion frequency f, which occurs at a specific vehicle speed v:

$$\tan γ = f(v, f) \quad (6)$$

The damping of the wheel sets $D_{rad}$ is then a function of the conicity tan γ of the wheels or a function of the sinusoidal motion frequency f at the vehicle speed v:

$$D_{rad} = f(\tan γ) = f(v, f) \quad (7)$$

If therefore the measured sinusoidal motion frequency f corresponds to an anticipated value at relatively high vehicle speeds v, which indicates acceptable wear of the wheels with respect to their conicity tan γ, a change in the overall damping $D_g$ indicates a change in the damping of the anti-rolling damper or dampers $D_{schl}$ of the respective bogie.

If sufficient measurement data are then present, for example, in the form of characteristic diagrams, to represent the damping of the wheel sets $D_{rad}(v, f)$ as a function of the parameters of the speed v and the sinusoidal motion frequency f, it is possible to determine the damping coefficient of the anti-rolling damper $D_{schl}$ and the damping coefficient of the wheel sets $D_{rad}$ even at relatively high speeds v.

Against the background of the relationships represented above, as explained above, disclosed embodiments provide a method for monitoring the state of a bogie of a rail vehicle comprising at least one wheel set and at least one anti-rolling damper, wherein the wheels of the wheel set are rigidly connected by means of an axle and have an approximately conical wheel profile, the signals which correspond to a sinusoidal motion of the wheel set of the bogie, based on the conical wheel profile of the wheels are filtered out of the signals supplied by sensor means arranged on the bogie, wherein the frequency of the sinusoidal motion is determined with respect to peripheral conditions such as the respectively present vehicle speed and is compared with a stored value or value range, typical of the present peripheral conditions, for the frequency of the sinusoidal motion, wherein the deviation of the measured frequency from the stored value or value range is monitored for this frequency.

If the frequency of the sinusoidal motion, which is determined, for example, by means of a Fourier transformation from a measured time signal and a filtered time signal of a lateral acceleration signal, deviates by more than a predefined value from a frequency value which is anticipated for these peripheral conditions, this is an indication of the occurrence of an unacceptable state of wear in the form of an unacceptably high equivalent conicity tan γ of the wheels of the wheel sets of the bogie.

Particularly, the peripheral conditions may comprise, in addition to the vehicle speed, at least one of the following parameters: the load on the rail vehicle, the currently acting braking forces or driving forces, cornering, straight-ahead travel, the state of the section of track being currently traveled on and the like. For example, characteristic diagrams with the sinusoidal motion frequencies which are characteristic of the respective peripheral conditions are then stored and compared with the frequencies for the sinusoidal motion which are determined during operation.

According to a further aspect of the disclosed embodiments, a method for monitoring the state of a bogie of a rail vehicle, comprising at least one wheel set and at least one anti-rolling damper, is proposed, wherein the wheels of the wheel set are rigidly connected by an axle and have an approximately conical wheel profile, a damping characteristic value is determined from the signals supplied by at least one sensor arranged on the bogie. The determined damping characteristic value is compared with a stored typical value or value range for the damping characteristic value, wherein when there is a deviation of the determined damping characteristic value from the stored value or value range for the damping characteristic value which exceeds a predetermined amount, it is checked how high the speed of the rail vehicle is in relation to a predefined speed limit; when the speeds of the rail vehicle undershoot the predefined speed limit, a signal for a change in the vicinity of the anti-rolling damper of the bogie is generated.

Alternatively, when the speeds of the rail vehicle reach or exceed the speed limit, the signals which correspond to a sinusoidal motion of the wheel set of the bogie based on the conical wheel profile of the wheels, are filtered out of the signals supplied by the sensor means arranged on the bogie, and a damping characteristic value of the wheel set of the bogie is determined as a function of the determined frequency of the sinusoidal motion and the speed which is present, based on a stored characteristic diagram which describes the dependence of the damping characteristic value of the wheel set on the speed of the rail vehicle and the frequency of the sinusoidal motion.

The determined damping characteristic value of the wheel set of the bogie is compared with a stored value or value range which is typical of the current speed of the rail vehicle and the current frequency of the sinusoidal motion, for the damping characteristic value of the wheel set of the bogie. When there is a deviation of the determined damping characteristic value of the wheel set of the bogie from the stored value or value range for the damping characteristic value of the wheel set of the bogie which exceeds a predetermined amount, a signal for the occurrence of a change in the vicinity of the wheel set of the bogie is generated, or when there is a deviation of the determined damping characteristic value of the wheel set of the bogie from the stored value or value range for the damping characteristic value of the wheel set of the bogie which reaches or undershoots the predetermined amount, a signal for the occurrence of a change in the vicinity of the anti-rolling damper of the bogie is generated.

The signals supplied by the sensor may be lateral acceleration signals from which the frequency range from 3 Hz to 9 Hz is filtered out by a filter. This frequency range is typically the frequency range in which the sinusoidal motion occurs. With the method described above, the chassis component (wheels or anti-rolling damper) which respectively has the unacceptable state of wear or fault state can consequently be unambiguously identified.

Counter-measures, which can take the form of prompt execution of maintenance of the affected wheel set or anti-rolling damper of the bogie or in extreme cases immediate braking of the rail vehicle or rail vehicle train, can be initiated, on the basis of the signal, either automatically or by the tractive unit driver. Remote data transmission of the signal to a maintenance station is also conceivable.

Disclosed methods can be implemented cost-effectively by sensors for monitoring the movements of a bogie and by an evaluation device for evaluating the sensor signals of these sensor means.

Advantageous developments and improvements specified herein are possible by virtue of the disclosed measures.

The signal can be represented visually and/or acoustically to the tractive unit driver of the rail vehicle train, for example in the form of a flashing warning lamp or by means of a warning tone so that the driver initiates counter-measures. In particular, the signal represents a maintenance signal relating to imminent maintenance of the affected wheel set or bogie, during which maintenance this wheel set has to be processed in such a way that the equivalent conicity assumes again acceptable or non-critical values and the anti-rolling dampers are checked and/or replaced.

More precise information regarding the detailed description follows with reference to the figures.

FIG. 1 shows a rail vehicle of a rail vehicle of a rail vehicle train which has, for example, two bogies 3 each with two wheel sets 4 and two anti-rolling dampers 5. In this context, the wheel sets 4 roll parallel rails 2, comprising an axle 2 and two wheels 8 rigidly attached thereto. The wheels 8 of the wheel sets 4 each have an approximately conical wheel profile, i.e. the wheel diameter on the running face is reduced in a known fashion in a direction pointing away from the wheel flange. This results in the sinusoidal motion explained at the beginning, i.e. periodic oscillations relative to the rails 2 and to the car body 1 of the rail vehicle, during the rolling of the wheel set 4 on the rails 2.

A sensor 10 for recording oscillations of the bogies 3 which occur transversely to the direction of travel is assumed to be attached to each of the two bogies 3. Acceleration sensors 10 which record the lateral acceleration of the bogies 3 may be used. However, travel pickups and/or speed pickups are also conceivable. The lateral acceleration signals from the sensors 10 are applied to a microprocessor-based evaluation device 12 which is shown schematically in FIG. 3. The frequency range from 3 Hz to 9 Hz is filtered out, for example by a filter, from the signals supplied by the sensors 10. This frequency range is typically the frequency range in which the sinusoidal motion occurs.

Figure 2:
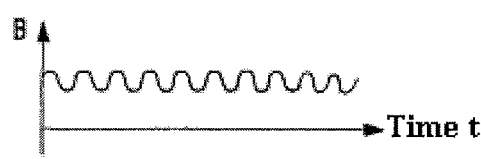
FIG. 2 shows a diagram which represents a signal for the lateral oscillations of a bogie plotted over time t.

The corresponding signals B, which characterize the sinusoidal motion of the rail vehicle, of the sensors 10 are represented plotted over time t in FIG. 2. As is apparent from FIG. 2, signals which represent the sinusoidal motion of the bogies 3 are periodically sinusoidal and essentially undamped because the wheel sets 4 are subject to continuous external excitation by the sinusoidal motion. For this reason, the oscillation amplitudes are approximately of equal size given a constant speed v.

The frequency f of the sinusoidal motion depends on peripheral conditions such as, inter alia, on the instantaneous traveling speed v of the rail vehicle and/or on the rotational speed of the wheels 8. The peripheral conditions, which influence the frequency f of the sinusoidal motion, may comprise, in addition to the vehicle speed v, at least one of the following parameters: the load on the rail vehicle, the currently acting braking forces or driving forces, cornering or straight-head travel, the state of the section of rail currently being traveled on and the like. In this context, for each peripheral condition, in particular for each speed v, there is, depending on factors such as the geometry of the wheel/rail contact (equivalent conicity), a characteristic frequency f or a characteristic frequency range for the frequency f of the sinusoidal motion which can be determined in advance, for example, by trials and can be stored as reference values in characteristic diagrams of the evaluation device.

Figure 3:
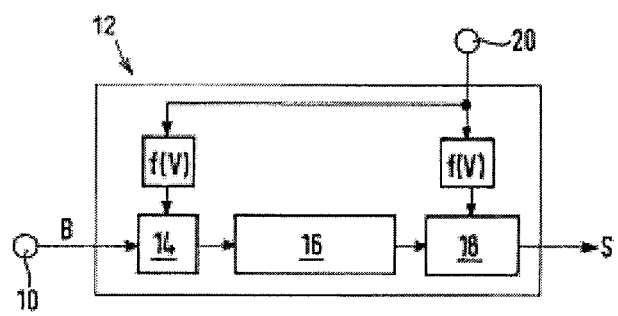
FIG. 3 shows a schematic illustration of a device for monitoring the state of the bogie according to a disclosed embodiment.

The evaluation device 12 according to FIG. 3 may have a filter 14, a signal-conditioning unit 16 and a comparator 18. The evaluation device 12 also receives a signal for the instantaneous vehicle speed v via a speed sensor 20. The frequency f(v), dependent on the measured vehicle speed v, of the instantaneous oscillations of the bogie 3 in the form of the sinusoidal motion may be determined by a fast Fourier transformation (FFT) of the time signals of the acceleration sensor 10 (FIG. 2) within the signal-conditioning unit 16.

Furthermore, the characteristic diagrams which represent the dependence of the frequency f of the sinusoidal motion on the peripheral conditions or operating conditions of the rail vehicle such as, for example, the instantaneous traveling speed v of the rail vehicle or on the rotational speed of the wheels 8, may be stored in the comparator 18 of the evaluation device 12. These characteristic diagrams with the characteristic frequencies f for the sinusoidal motion are determined in advance, for example, by trials.

The frequency f(v), which is based on the measured time signals B and is supplied by the signal-conditioning unit 16, of the periodic oscillations in relation to the respectively present vehicle speed v or wheel speed is then compared with a stored value or value range, typical of the present peripheral conditions, such as the current vehicle speed v, for the frequency f(v) of the sinusoidal motion, and the deviation of the measured frequency f(v) from the stored value f(v) or from the stored value range is monitored.

When the measured frequency f(v) deviates from the stored value f(v) or from the stored value range by a predetermined amount, a signal S for the occurrence of an unacceptable state of wear of the wheel sets 4 may be generated. To be more precise, in the case of such a signal S it is to be assumed that the conicity of the wheel sets 4 of the affected bogie assumes critical values with respect to the running stability of the bogie 3. Since, for example, a sensor 10 is present at each bogie 3, the signal can be assigned to the respective bogie 3 or the wheel sets 4 thereof.

This signal S can be represented visually and/or acoustically to the tractive unit driver of the rail vehicle train or maintenance personnel, for example in the form of warning lamps or by means of warning tones, so that counter-measures can be initiated. In particular, the signal S represents a maintenance signal relating to imminent maintenance of the wheel sets 4 of the affected bogie 3 and can also be stored in a memory, which can be read out, of the evaluation device for the maintenance personnel. The counter-measures can consist in the wheel sets 4 of the affected bogie 3 being re-worked in such a way that the wheel/rail geometry, in particular the equivalent conicity has acceptable or non-critical values and as a result damping properties of the wheel sets 4 within the scope of the sinusoidal motion are produced, which damping properties prevent a critical embodiment of the sinusoidal motion, in particular in the case of high speeds v.

Figure 5:
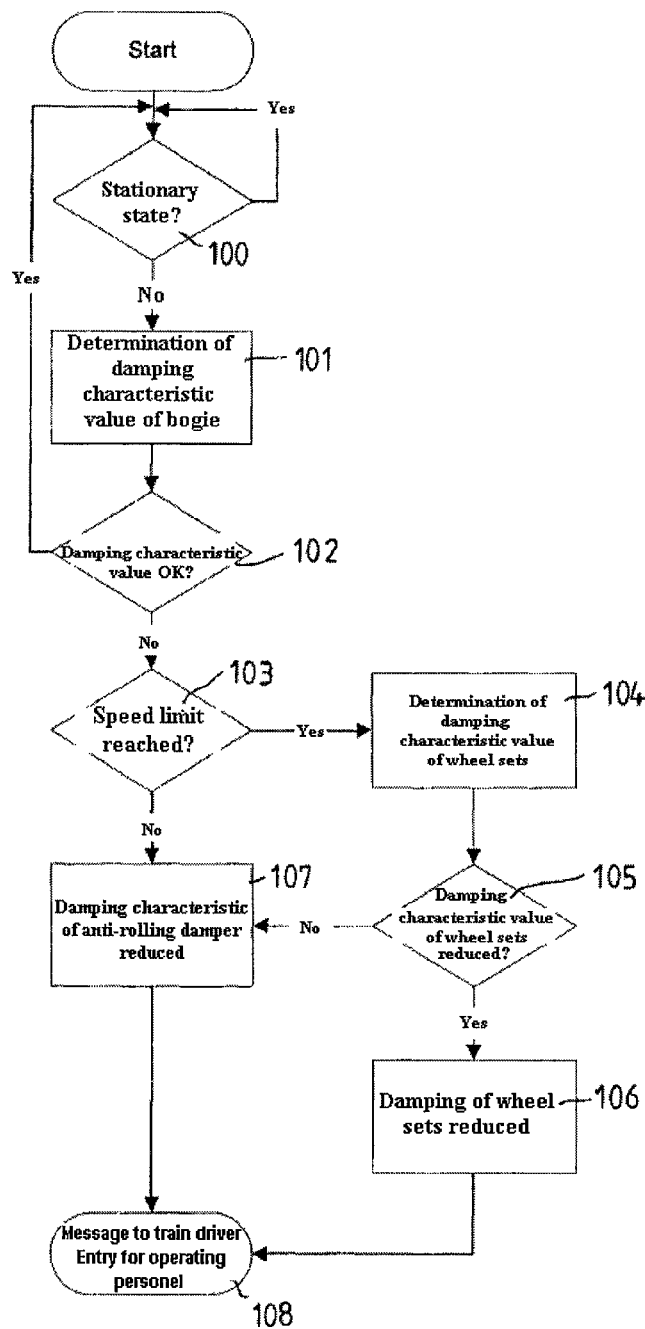
FIG. 5 shows a flowchart of a disclosed embodiment of a corresponding method.

FIG. 5 illustrates a flowchart of a further exemplary embodiment of a method. This method is also carried out by means of an evaluation device 12 shown in FIG. 3.

After the program start, it is checked, on the basis of an interrogation in step 100, whether or not the rail vehicle is in the stationary state. If the stationary state is present, the program returns to the start. If, on the other hand, the rail vehicle is traveling, the overall damping characteristic value or the overall damping coefficient $D_g$ of the bogie 3 is determined within the scope of step 101 from the signals supplied by a sensor 10 arranged on a bogie 3.

Figure 4:
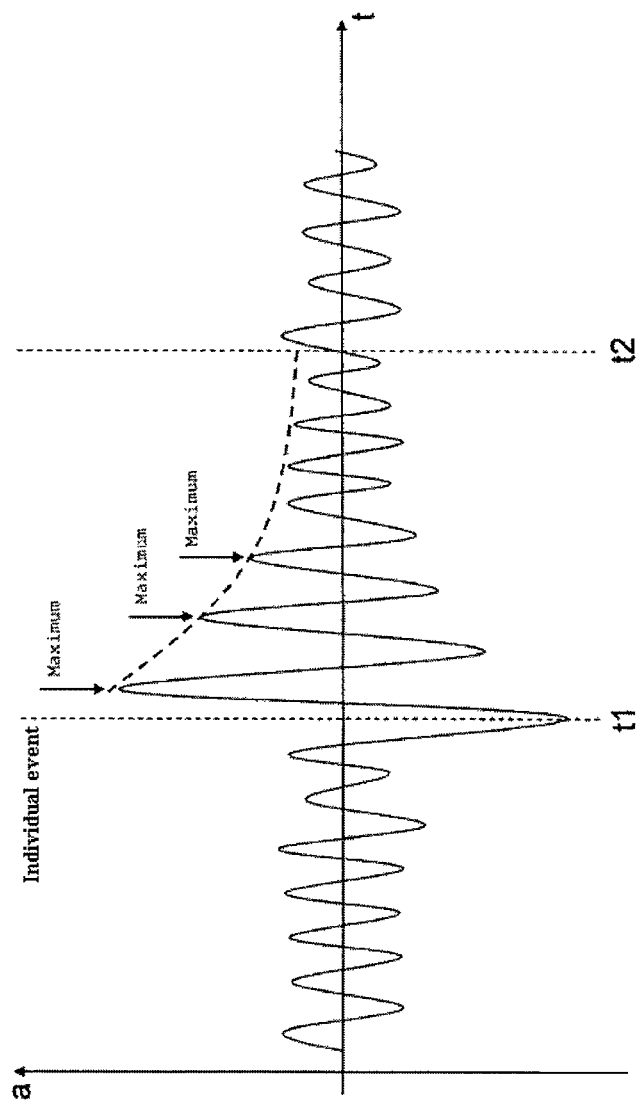
FIG. 4 shows a diagram which represents an acceleration signal plotted over time for determining a damping characteristic value.

In this context, time signals a according to FIG. 4, which may be supplied by the sensor 10, are used. Assuming that the bogie 3 is excited at the time $t_1$ to experience lateral oscillations as a result of an individual event, that is to say as a result of a one-off impulse excitation such as, for example, traveling over a railway switch, the typical damped and therefore decaying oscillation profile which is shown in FIG. 4 occurs, wherein, on the one hand, the damping coefficient $D_{rad}$ of the wheel sets 4 and the damping coefficient $D_{schl}$ of the anti-rolling damper 5, originating from the wheel/rail geometry, in particular from the conicity of the wheels 8, contribute to the overall damping $D_g$ of the bogie 3 of this lateral oscillation.

The profile of the oscillation amplitudes from the time $t_1$ of the excitation to a time $t_2$ in which the oscillation amplitudes are approximately constant again is decaying, i.e. the maximum value of the oscillation amplitudes decreases with time. This behavior can be characterized which by an envelope or tangent to the oscillation maximum values of the oscillation amplitudes in the time period between $t_1$ and $t_2$. On the basis of the gradient of this tangent it is then possible to determine the overall damping coefficient $D_g$ of the bogie 3.

Within the scope of step 102, the determined overall damping coefficient $D_g$ of the bogie 3 is compared with a stored typical value or value range for the overall damping coefficient $D_g$ of the bogie 3.

If in this context a deviation of the determined overall damping coefficient $D_g$ of the bogie 3 from the stored value or value range for the overall damping coefficient $D_g$ of the bogie 3 does not exceed a predetermined amount (damping characteristic value OK), it is to be assumed that there is sufficient damping of the bogie 3, and the program returns again to the start.

If, on the other hand, a deviation of the determined overall damping coefficient $D_g$ of the bogie 3 from the stored value or value range for the overall damping coefficient $D_g$ of the bogie 3 which exceeds the predetermined amount occurs (damping characteristic value not OK), it is checked within the scope of step 103 how high the speed of the rail vehicle is relative to a predefined speed limit. The term "speed limit" here means the speed above which a non-negligible influence of the wheel sets 4 of a bogie 3 on the overall damping $D_g$ is present. This speed limit may be determined in advance by trials.

As explained at the beginning, in the case of low speeds the influence of the wheel/rail contact on the damping behavior can be ignored and the damping properties of the bogie 3 are determined decisively by the anti-rolling damper 5 of the bogie 3. In the case of speeds of the rail vehicle which undershoot the predefined speed limit and in the case of an insufficient overall damping $D_g$ being detected within the scope of the preceding step 102, a signal S for a change of the damping coefficient $D_{schl}$ of the anti-rolling damper 5 of the bogie 3 is consequently generated by the evaluation device 12. The designation and embodiment of this signal are variable here. The only decisive factor is that it indicates a change in the vicinity of the anti-rolling damper 5 of the respective bogie 3.

However, in the case of speeds of the rail vehicle which reach or exceed the speed limit, in addition to the damping coefficient $D_{schl}$ of the anti-rolling damper 5 the damping coefficient $D_{rad}$ of the wheel sets 4 is also decisive.

In the case of relatively high speeds, the signals which correspond to a sinusoidal motion, based on the conical wheel profile of the wheels 8, of the wheel sets 4 of the bogie 3 are filtered out by the filter 14 of the evaluation device 12 from the signals supplied by the sensor 10 arranged on the bogie 3.

These signals are filtered and transformed into the frequency range by a Fourier transformation. The result is then the current sinusoidal motion frequency f of the rail vehicle or of the respective bogie 3 at the current speed v. In a memory of the comparator 18 of the evaluation device 12, the characteristic diagrams which describe the dependence of the damping coefficient $D_{rad}$ of the wheel sets 4 on the speed v of the rail vehicle and on the frequency f of the sinusoidal motion are stored. Then, in step 104, the decisive damping characteristic value $D_{rad}$ of the wheel sets 4 of the bogie 3 can be determined on the basis of these characteristic diagrams as a function of the previously determined sinusoidal motion frequency f which is present and of the speed v which is present.

Then, within the scope of step 105, the determined damping characteristic value $D_{rad}$ of the wheel sets 4 of the bogie 3 is compared with a stored value or value range, typical of the current speed v of the rail vehicle and the current frequency f of the sinusoidal motion, for the damping characteristic value $D_{rad}$ of the wheel sets 4 of the bogie 3.

If this comparison 105 reveals that the damping coefficient $D_{rad}$, determined within the scope of step 104, of the wheel sets 4 of the bogie 3 deviates from the stored value or value range for the damping coefficient $D_{rad}$ of the wheel sets 4 of the bogie 3 by more than a predetermined amount, a signal 106 for the occurrence of a change in the vicinity of the wheel sets 4 of the respective bogie 3 is generated. This signal is then intended to indicate a relevant reduction in the damping coefficient $D_{rad}$ of the wheel sets 4 of the bogie 3.

However, if the comparison 105 reveals that the damping coefficient $D_{rad}$, determined within the scope of step 104, of the wheel sets 4 of the bogie 3 deviates from the stored value or value range for the damping coefficient $D_{rad}$ of the wheel sets 4 of the bogie 3 by less than the predetermined amount, a signal 107 for the occurrence of a change in the vicinity of the anti-rolling damper 5 of the bogie 3 is generated. This signal is then intended to indicate a relevant reduction in the damping coefficient $D_{schl}$ of the anti-rolling damper 5 of the bogie 3.

In step 108, the signals 106 or 107 can be represented to the tractive unit driver of the rail vehicle train visually and/or acoustically, for example in the form of a flashing warning lamp or by means of warning tone so that the tractive unit driver initiates counter-measures. In particular, the signals 106 or 107 represent maintenance signals relating to imminent, also unscheduled, maintenance of the wheel sets 4 or of the anti-rolling damper of the affected bogie 3. Alternatively, the speed of the rail vehicle or of the rail vehicle train can also be reduced automatically.

LIST OF REFERENCE NUMBERS

1 Car body
2 Rails
3 Bogie
4 Wheel sets
5 Anti-rolling damper
6 Axle
8 Wheels
10 Acceleration sensor
12 Evaluation device
14 Filter
16 Signal-conditioning unit
18 Comparator
20 Speed sensor

The invention claimed is:

1. A method for monitoring the state of a bogie of a rail vehicle, comprising at least one wheel set, wherein the wheels of the at least one wheel set are rigidly connected by an axle and have an approximately conical wheel profile, the method comprising:
filtering out signals which correspond to a sinusoidal motion of the at least one wheel set of the bogie based on the conical wheel profile of the wheels so that the sinusoidal motion signals are filtered out of the signals supplied by at least one sensor arranged on the bogie, wherein the sinusoidal motion indicates motion behavior of the at least one wheel set with the approximately conical wheel profile;
determining, using a microprocessor-based evaluation device, a frequency (f) of the sinusoidal motion with respect to peripheral conditions including a respectively present vehicle speed;
comparing, using a microprocessor-based evaluation device, the determined frequency with a stored value or value range indicative of present peripheral conditions, for the frequency (f) of the sinusoidal motion; and
monitoring a deviation of the measured frequency (f) from the stored value or value range,
wherein, the frequency of the sinusoidal motion is determined using a Fourier transformation from a measured time signal and a filtered time signal of a lateral acceleration signal, and, a determination of an unacceptable state of wear has occurred if the frequency of the sinusoidal motion deviates by more than a predefined value from a frequency value which is anticipated for peripheral conditions, wherein a damping characteristic value of the wheel set of the bogie is determined as a function of the determined frequency of the sinusoidal motion and the speed which is present.

2. The method of claim 1, further comprising generating a signal (S) when a deviation of the measured frequency (f) of the sinusoidal motion from the stored value or value range for this frequency (f) exceeds a predetermined amount.

3. The method of claim 1, wherein the peripheral conditions comprise, in addition to the vehicle speed (v), at least one of the following parameters: load on the rail vehicle, braking forces or driving forces, bendy or straight-ahead travel, and state of a section of track being currently traveled on.

4. The method of claim 1, wherein the signal (S) is represented visually and/or acoustically.

5. The method of claim 1, wherein the signal (S) constitutes a maintenance signal relating to imminent maintenance of the affected component of the bogie.

6. The method of claim 1, further comprising reducing the speed of the rail vehicle in response to the signal (S).

7. The method of claim 1, further comprising filtering the signals supplied by the at least one sensor to remove lateral acceleration signals from which the frequency range from 3 Hz to 9 Hz.

8. A device for carrying out the method of claim 1, the device including at least one vehicle-mounted sensor monitoring movements of the bogie; and
an evaluation device evaluating the sensor signals generated by the at least one sensor.

9. The device of claim 8, wherein the at least one sensor includes at least one acceleration sensor, arranged on the bogie for measuring the lateral acceleration of the bogie.

10. A computer program product having program components for carrying out the method of claim 1.

11. The computer program product of claim 10, stored on a computer-readable recording medium or in a computer-readable recording device.

12. The method of claim 1, wherein the determination of the occurrence of the unacceptable state of wear is based on an unacceptably high equivalent conicity tan γ of the wheels of the wheel sets of the bogie.

13. The method of claim 1, wherein characteristic diagrams with the sinusoidal motion frequencies which are characteristic of peripheral conditions are stored and compared with frequencies for the sinusoidal motion which are determined during operation.

14. The method of claim 1, wherein the damping characteristic value is determined based on a stored characteristic diagram which describes the dependence of the damping characteristic value of the wheel set on the speed of the rail vehicle and the frequency of the sinusoidal motion.

15. A method for monitoring the state of a bogie of a rail vehicle, comprising at least one wheel set and at least one anti-rolling damper, wherein wheels of the at least one wheel set are rigidly connected by an axle and have an approximately conical wheel profile, the method comprising:
- determining, using a microprocessor-based evaluation device, a damping characteristic value signals supplied by at least one sensor arranged on the bogie;
- comparing, using a microprocessor-based evaluation device, the determined damping characteristic value with a stored typical value or value range for the damping characteristic value;
- checking how high a speed of the rail vehicle is in relation to a predefined speed limit when there is a deviation of the determined damping characteristic value from the stored value or value range for the damping characteristic value which exceeds a predetermined amount;
- generating a signal (S) indicating the occurrence of a change in the vicinity of the anti-rolling damper of the bogie when a speed of the rail vehicle undershoots a predefined speed limit;
- filtering signals which correspond to a sinusoidal motion of the at least one wheel set of the bogie out of signals supplied by the at least one sensor arranged on the bogie based on the approximately conical wheel profile when the speeds of the rail vehicle reach or exceed the predefined speed limit, wherein the sinusoidal motion indicates motion behavior of the at least one wheel set with the approximately conical wheel profile;
- determining, using a microprocessor-based evaluation device, a damping characteristic value of the wheel set of the bogie as a function of the determined frequency (f) of the sinusoidal motion and a present speed (v) based on at least one stored characteristic diagram which describes dependence of the damping characteristic value of the wheel set on the speed (v) of the rail vehicle and the frequency (f) of the sinusoidal motion;
- comparing the determined damping characteristic value of the at least one wheel set of the bogie with a stored value or value range indicative of the present speed (v) of the rail vehicle and the current frequency (f) of the sinusoidal motion for the damping characteristic value of the at least one wheel set of the bogie; and
- when there is a deviation of the determined damping characteristic value of the at least one wheel set of the bogie from the stored value or value range for the damping characteristic value of the wheel set of the bogie which exceeds a predetermined amount, generating a signal (S) for the occurrence of a change in the vicinity of the wheel set of the bogie; or
- when there is a deviation of the determined damping characteristic value of the at least one wheel set of the bogie from the stored value or value range for the damping characteristic value of the wheel set of the bogie which reaches or undershoots the predetermined amount, generating a signal (S) for the occurrence of a change in the vicinity of the anti-rolling damper of the bogie,
- wherein, the frequency of the sinusoidal motion is determined using a Fourier transformation from a measured time signal and a filtered time signal of a lateral acceleration signal, and, a determination of an unacceptable state of wear has occurred if the frequency of the sinusoidal motion deviates by more than a predefined value from a frequency value which is anticipated for peripheral conditions, wherein the damping characteristic value of the wheel set of the bogie is determined as a function of the determined frequency of the sinusoidal motion and the speed which is present.

16. The method of claim 15, wherein the signal (S) is represented visually and/or acoustically.

17. The method of claim 15, wherein the signal (S) constitutes a maintenance signal relating to imminent maintenance of the affected component of the bogie.

18. The method of claim 15, further comprising reducing the speed of the rail vehicle in response to the signal (S).

19. The method of claim 15, further comprising filtering the signals supplied by the at least one sensor to remove lateral acceleration signals from which the frequency range from 3 Hz to 9 Hz.

20. A device for carrying out the method of claim 15, the device including at least one vehicle-mounted sensor monitoring movements of the bogie; and
an evaluation device evaluating the sensor signals generated by the at least one sensor.

21. The device of claim 20, wherein the at least one sensor includes at least one acceleration sensor, arranged on the bogie for measuring the lateral acceleration of the bogie.

22. A computer program product having program components for carrying out the method of claim 15.

23. The computer program product of claim 22, stored on a computer-readable recording medium or in a computer-readable recording device.

24. The method of claim 15, wherein the determination of the occurrence of the unacceptable state of wear is based on an unacceptably high equivalent conicity tan γ of the wheels of the wheel sets of the bogie.

25. The method of claim 15, wherein characteristic diagrams with the sinusoidal motion frequencies which are characteristic of peripheral conditions are stored and compared with frequencies for the sinusoidal motion which are determined during operation.

26. The method of claim 15, wherein the damping characteristic value is determined based on a stored characteristic diagram which describes the dependence of the damping characteristic value of the wheel set on the speed of the rail vehicle and the frequency of the sinusoidal motion.

* * * * *